United States Patent
Yawata et al.

(10) Patent No.: US 9,165,594 B2
(45) Date of Patent: Oct. 20, 2015

(54) SPINDLE MOTOR AND DISK DRIVE APPARATUS

(71) Applicant: Nidec Corporation, Kyoto (JP)

(72) Inventors: Atsushi Yawata, Kyoto (JP); Hirotoshi Uchibori, Kyoto (JP); Toshihiro Akiyama, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/458,426

(22) Filed: Aug. 13, 2014

(65) Prior Publication Data

US 2015/0085398 A1 Mar. 26, 2015

Related U.S. Application Data

(60) Provisional application No. 61/881,584, filed on Sep. 24, 2013.

(51) Int. Cl.
*G11B 19/20* (2006.01)
*F16C 17/02* (2006.01)
*F16C 33/10* (2006.01)
*F16C 17/10* (2006.01)

(52) U.S. Cl.
CPC .............. *G11B 19/20* (2013.01); *F16C 17/026* (2013.01); *F16C 33/107* (2013.01); *G11B 19/2009* (2013.01); *G11B 19/2036* (2013.01); *F16C 17/107* (2013.01)

(58) Field of Classification Search
None
See application file for complete search history.

(56) References Cited

U.S. PATENT DOCUMENTS

| | | | |
|---|---|---|---|
| 8,587,895 B1 | 11/2013 | Sumiji et al. | |
| 8,599,513 B1 | 12/2013 | Kimura et al. | |
| 8,737,016 B1 * | 5/2014 | Kim et al. | 360/99.08 |
| 8,807,836 B2 * | 8/2014 | Kodama et al. | 384/107 |
| 2004/0090702 A1 | 5/2004 | Aiello et al. | |
| 2008/0006332 A1 | 1/2008 | Ishizawa et al. | |
| 2008/0075398 A1 * | 3/2008 | Kimura et al. | 384/107 |
| 2009/0140587 A1 | 6/2009 | Popov et al. | |
| 2010/0124387 A1 | 5/2010 | Fuss et al. | |

(Continued)

FOREIGN PATENT DOCUMENTS

JP 2009-136143 A 6/2009

OTHER PUBLICATIONS

Uchibori et al.; "Bearing Mechanism, Spindle Motor Including the Bearing Mechanism and Electronic Equipment Including the Spindle Motor"; U.S. Appl. No. 14/458,437, filed Aug. 13, 2014.

(Continued)

*Primary Examiner* — Wayne Young
*Assistant Examiner* — Carlos E Garcia
(74) *Attorney, Agent, or Firm* — Keating & Bennett, LLP (57) ABSTRACT

A spindle motor includes a stationary portion with a shaft, a circular plate portion, a wall portion, and a plate portion. The plate portion has a flat plate portion and an annular convex portion. The sleeve includes an annular portion, an outer side cylindrical portion, and an inner side cylindrical portion. The inner side cylindrical portion and an upper radial dynamic pressure groove array are superimposed in a radial direction. The upper radial dynamic pressure groove array includes a plurality of upper spiral grooves that is inclined in one direction with respect to an axial direction and a plurality of lower spiral grooves that is inclined in another direction opposite to the one direction. A lower end of the upper spiral grooves is positioned farther on an upper side than an upper surface of the annular portion.

10 Claims, 8 Drawing Sheets

(56) References Cited

U.S. PATENT DOCUMENTS

| | | |
|---|---|---|
| 2010/0315742 A1* | 12/2010 | Kimura et al. ............... 360/224 |
| 2012/0033329 A1 | 2/2012 | Mizukami et al. |
| 2012/0183243 A1* | 7/2012 | Sugiki ........................ 384/107 |
| 2012/0326543 A1* | 12/2012 | Kimura et al. ................ 310/90 |
| 2013/0003223 A1 | 1/2013 | Kimura et al. |
| 2013/0077190 A1 | 3/2013 | Kimura et al. |
| 2013/0120868 A1 | 5/2013 | Mizukami et al. |
| 2013/0128379 A1 | 5/2013 | Mizukami et al. |
| 2013/0234552 A1* | 9/2013 | Kodama et al. ................ 310/90 |
| 2013/0321951 A1 | 12/2013 | Sumiji et al. |
| 2014/0010065 A1 | 1/2014 | Kimura et al. |

OTHER PUBLICATIONS

Yawata; "Spindle Motor and Disk Drive Apparatus"; U.S. Appl. No. 14/458,413, filed Aug. 13, 2014.

\* cited by examiner

SPINDLE MOTOR AND DISK DRIVE APPARATUS

BACKGROUND OF THE INVENTION

1. Field of the Invention

The present invention relates to a spindle motor, and more specifically to a disk drive apparatus including a spindle motor.

2. Description of the Related Art

When a motor is to be made thin for a thin hard disk drive apparatus, the oil accommodating volume within the motor also decreases. The maximum possible oil buffer is required in order to accommodate as much oil as possible in a bearing. In addition, the center of gravity is biased to an upper side where a disk is arranged, and thus dynamic pressure that is generated in a radial dynamic pressure bearing portion on the upper side has to be increased.

SUMMARY OF THE INVENTION

In order to increase the dynamic pressure, the length of the radial dynamic pressure bearing portion has to be ensured. The inventors of the present application discovered that the radial dynamic pressure bearing portion and an oil buffer portion have to be superimposed in a radial direction when an oil buffer with a sufficient volume and the length of the radial dynamic pressure bearing portion in an axial direction are to be provided at the same time. In a case where the oil buffer and the radial dynamic pressure bearing portion are superimposed in the radial direction, the radial direction thickness of a sleeve side of the radial dynamic pressure bearing portion may be decreased and the rigidity of a sleeve may be insufficient with respect to the dynamic pressure generated in the radial dynamic pressure bearing portion.

A spindle motor according to a first exemplary preferred embodiment of the present invention includes a stationary portion and a rotating portion. The stationary portion includes a shaft that is arranged along a central axis which extends upward and downward. The rotating portion includes a rotatable sleeve around the shaft. The stationary portion further includes the shaft, a circular plate portion, a wall portion, and a plate portion. The circular plate portion extends from the shaft to a radial direction outer side. The wall portion extends upward from an outer edge of the circular plate portion and preferably has a cylindrical or substantially cylindrical shape. The plate portion surrounds the shaft above the circular plate portion and preferably has a cylindrical or substantially annular shape. The plate portion includes a flat plate portion and an annular convex portion. The flat plate portion extends from an outer circumferential surface of the shaft to the radial direction outer side. The annular convex portion extends downward from an outer edge of the flat plate portion and preferably has an annular or substantially annular shape. An upper radial dynamic pressure groove array and a lower radial dynamic pressure groove array are arranged either apart from each other or adjacent to each other in an axial direction on one or both of an inner circumferential surface of the sleeve and the outer circumferential surface of the shaft. The sleeve includes an annular portion, an outer side cylindrical portion, and an inner side cylindrical portion. The annular portion preferably has an annular or a substantially annular shape. The outer side cylindrical portion extends upward from an outer edge of an upper surface of the annular portion. The inner side cylindrical portion extends upward from an inner edge of the upper surface of the annular portion. The annular convex portion includes a plate inclined surface configured such that a distance between the plate inclined surface and the central axis increasing downward. The inner side cylindrical portion includes a sleeve inclined surface, a distance between the sleeve inclined surface and the central axis decreasing upward. The plate inclined surface and the sleeve inclined surface face each other via a gap. The inner side cylindrical portion and the upper radial dynamic pressure groove array are superimposed in a radial direction. The upper radial dynamic pressure groove array includes a plurality of upper spiral grooves that is inclined in one direction with respect to the axial direction and a plurality of lower spiral grooves that is inclined in another direction opposite to the one direction. The upper spiral grooves and the lower spiral grooves are arranged apart from each other or adjacent to each other in the axial direction. A lower end of the upper spiral groove is positioned farther on an upper side than the upper surface of the annular portion.

According to the spindle motor of the first exemplary preferred embodiment of the present invention, the rigidity of the sleeve is ensured.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, exemplary preferred embodiments of the present invention will be described with reference to the accompanying drawings. In the following description, a direction that is parallel or substantially parallel with a central axis of a spindle motor will be referred to as an "axial direction", a direction that is orthogonal or substantially orthogonal to the central axis of the spindle motor will be referred to as a "radial direction", and a direction that is along or substantially along an arc about the central axis of the spindle motor will be referred to as a "circumferential direction". In addition, in this specification, the axial direction is an up-down direction and a stator unit side with respect to a base portion is above in describing shapes and positional relationships of respective portions. However, the definition of the up-down direction does not limit the directions of the spindle motor according to various preferred embodiments of the present invention when the spindle motor is used.

Figure 1:
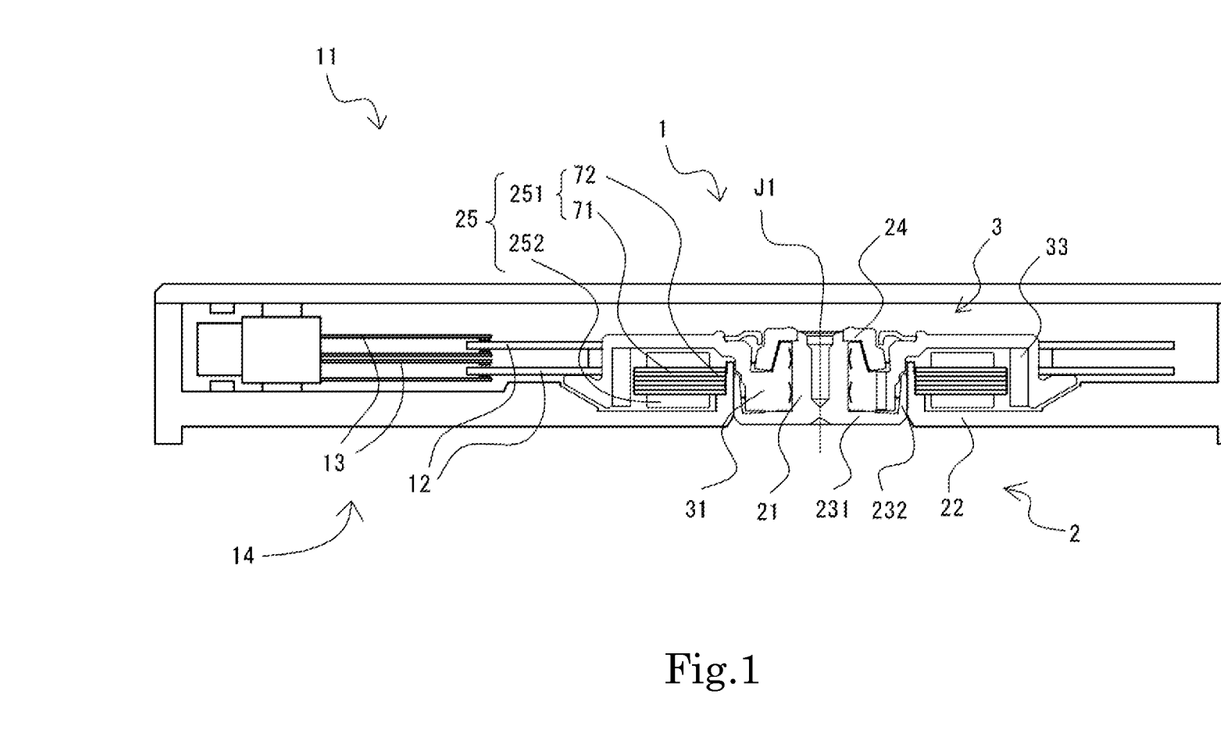
FIG. 1 is a cross-sectional view of a disk drive apparatus according to a preferred embodiment of the present invention.

Hereinafter, a configuration of a spindle motor 1 according to a preferred embodiment of the present invention will be described with reference to FIGS. 1 and 2. FIG. 1 is a cross-sectional view of a disk drive apparatus according to the present preferred embodiment of the present invention. As shown in FIG. 1, in this preferred embodiment, the spindle motor 1 is preferably used in a disk drive apparatus 11. The spindle motor 1 is an outer rotor type motor. The spindle motor 1 includes a stationary portion 2 and a rotating portion 3. The disk drive apparatus 11 preferably includes, for example, two magnetic disks (hereinafter, simply referred to as "disks") 12, an access unit 13, a housing 14, and the spindle motor 1. The disks 12 are supported by the rotating portion 3 of the spindle motor 1. The access unit 13 performs at least one of reading and writing of information on the disks 12. The housing 14 accommodates the spindle motor 1, the disks 12, and the access unit 13.

Figure 2:
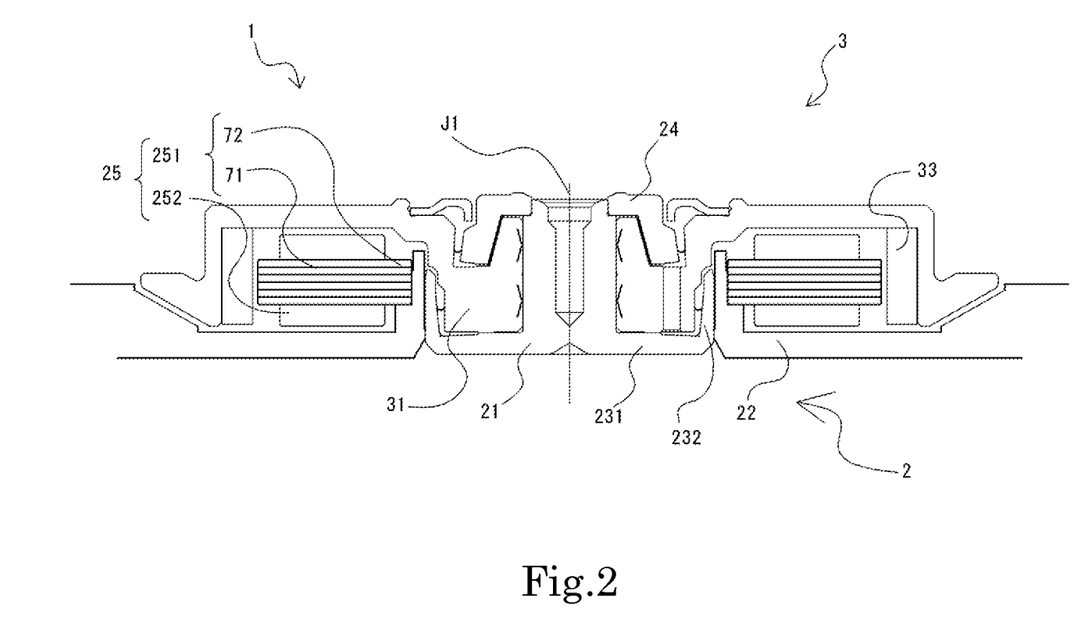
FIG. 2 is a cross-sectional view of a spindle motor according to a preferred embodiment of the present invention.

FIG. 2 is a cross-sectional view of the spindle motor according to a preferred embodiment of the present invention. In the spindle motor 1, the stationary portion 2 preferably includes a shaft 21, a base portion 22, a circular plate portion 231, a wall portion 232, a plate portion 24, and a stator unit 25. The shaft 21 is arranged along a central axis J1 that extends upward and downward. The circular plate portion 231 extends to a radial direction outer side from the shaft 21. The wall portion 232 preferably has a cylindrical or substantially cylindrical shape, and extends upward from an outer edge of the circular plate portion 231. The plate portion 24 preferably has a cylindrical or substantially cylindrical shape, and surrounds the shaft 21 above the circular plate portion 231.

The stator unit 25 is mounted on the base portion 22. The stator unit 25 generates a rotational force (torque) about the central axis J1 between a magnet 33 that is arranged around the shaft 21 and the stator unit 25. In other words, the stator unit 25 and the magnet 33 are drive mechanisms that rotate the rotating portion 3 with respect to the stationary portion 2.

The stator unit 25 preferably includes a stator core 251 and a plurality of coils 252. The stator core 251 preferably includes an annular-shaped core back 71 and a plurality of teeth 72. The core back 71 is fixed to the base portion 22. Each of the teeth 72 protrudes from the core back 71 toward the radial direction outer side. The stator core 251 is preferably made from, for example, a laminated steel sheet where a magnetic steel sheet is laminated in the axial direction. The coil 252 is configured by a conducting wire that is wound around each of the teeth 72.

Figure 3:
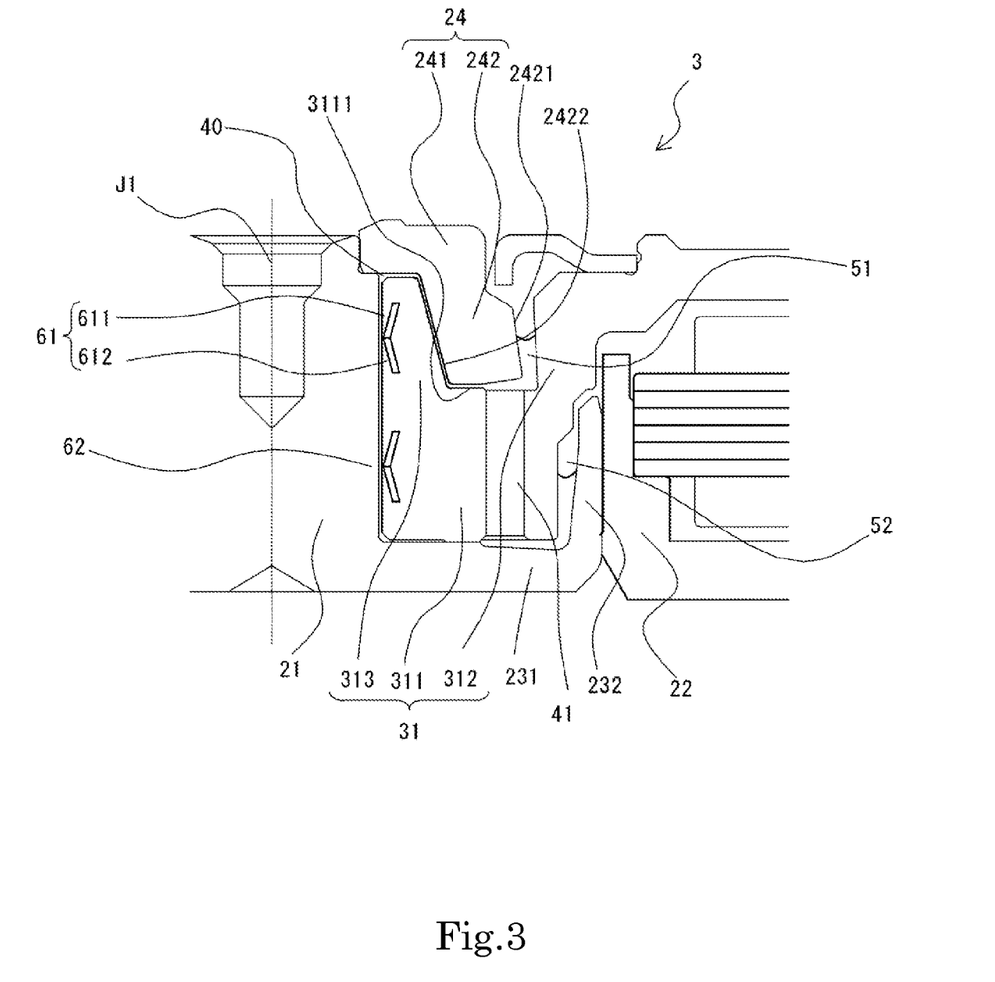
FIG. 3 is a partial cross-sectional view of the spindle motor according to a preferred embodiment of the present invention.

FIG. 3 is a partial cross-sectional view of the spindle motor according to a preferred embodiment of the present invention. The rotating portion 3 preferably includes a rotatable sleeve 31 around the shaft 21. The sleeve 31 includes an annular portion 311, an outer side cylindrical portion 312, and an inner side cylindrical portion 313. The annular portion 311 preferably has an annular or a substantially annular shape. The outer side cylindrical portion 312 extends upward from an outer edge of an upper surface 3111 of the annular portion. The inner side cylindrical portion 313 extends upward from an inner edge of the upper surface 3111 of the annular portion.

The plate portion 24 preferably includes a flat plate portion 241 and an annular convex portion 242. The flat plate portion 241 extends from an outer circumferential surface of the shaft 21 to the radial direction outer side. The annular convex portion 242 preferably has an annular or substantially annular shape, and extends downward from an outer edge of the flat plate portion 241. The annular convex portion 242 preferably includes a convex portion outer circumferential surface 2421 and a plate inclined surface 2422.

A small gap between the shaft 21, the circular plate portion 231, the wall portion 232, and the plate portion 24, and the sleeve 31 is preferably filled with a lubricating oil 40. Preferably, a liquid surface of the lubricating oil 40 is positioned in each of an upper seal portion 51 and a lower seal portion 52.

An outer circumferential surface of the plate portion 24 faces an inner circumferential surface of the outer side cylindrical portion 312 via the upper seal portion 51. In other words, the outer circumferential surface of the plate portion 24 and the inner circumferential surface of the outer side cylindrical portion 312 of the sleeve 31 define the upper seal portion 51. More preferably, the convex portion outer circumferential surface 2421 of the annular convex portion 242 faces the inner circumferential surface of the outer side cylindrical portion 312 via the upper seal portion 51. It is preferable that the upper seal portion 51 has a radial direction gap narrowing downward. In this preferred embodiment, the upper seal portion 51 preferably is configured to perform an oil buffering function.

The outer circumferential surface of the sleeve 31 faces an inner circumferential surface of the wall portion 232 via the lower seal portion 52. In other words, the outer circumferential surface of the sleeve 31 and the inner circumferential surface of the wall portion 232 define the lower seal portion 52. It is preferable that the lower seal portion 52 include a radial direction gap narrowing downward. In this preferred embodiment, the lower seal portion 52 preferably is configured to perform an oil buffering function.

In addition, the sleeve 31 preferably includes a through-hole 41 that penetrates the sleeve 31 in the axial direction. In the example of FIG. 3, the through-hole 41 penetrates the annular portion 311 in the axial direction. An upper opening of the through-hole 41 is positioned in the upper surface 3111 of the annular portion 311, and a lower opening of the through-hole 41 is positioned in a lower surface of the annular portion 311.

Figure 4:
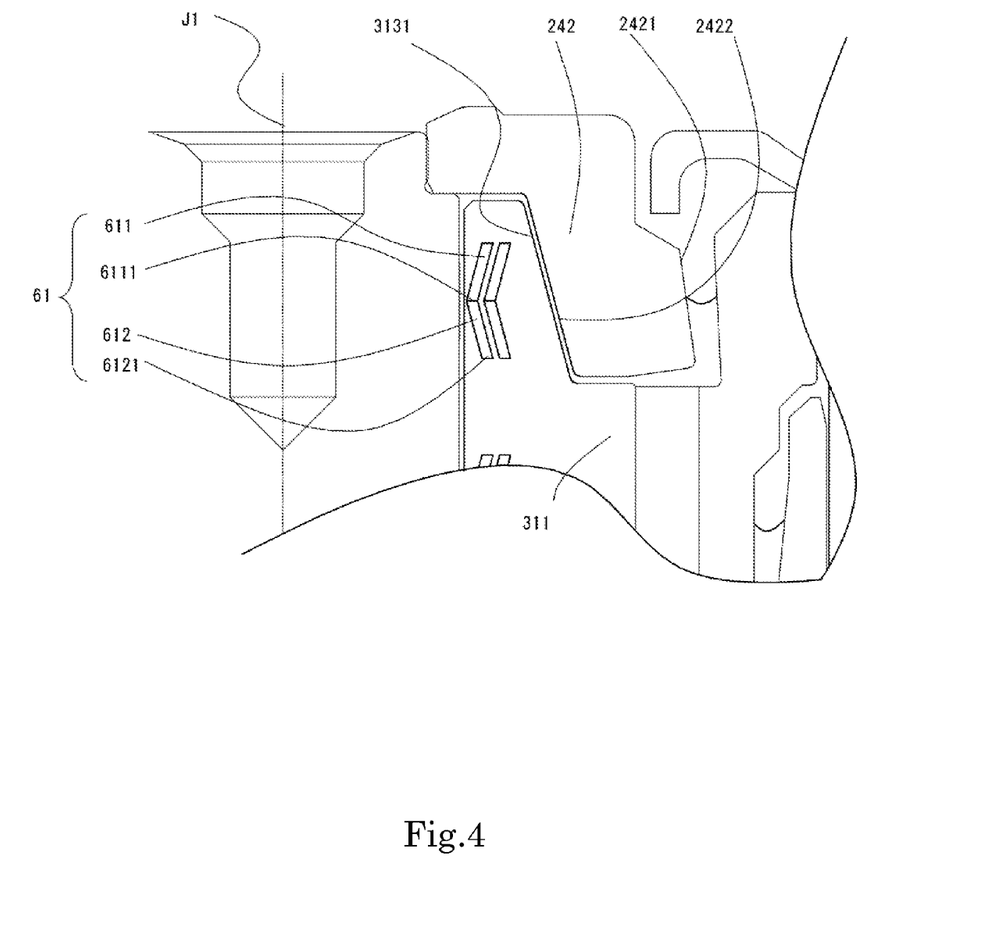
FIG. 4 is an enlarged partial cross-sectional view of the spindle motor according to a preferred embodiment of the present invention.

FIG. 4 is a partial cross-sectional view of the spindle motor according to a preferred embodiment of the present invention. The inner side cylindrical portion 313 of the sleeve 31 preferably includes a sleeve inclined surface 3131. The distance between the sleeve inclined surface 3131 and the central axis J1 decreases upward. The annular convex portion 242 of the plate portion 24 preferably includes the plate inclined surface 2422. The distance between the plate inclined surface 2422 and the central axis J1 increases downward. The plate inclined surface 2422 and the sleeve inclined surface 3131 face each other via a gap. In this manner, the rigidity of the inner side cylindrical portion 313 of the sleeve 31 is reliably ensured.

Figure 5:
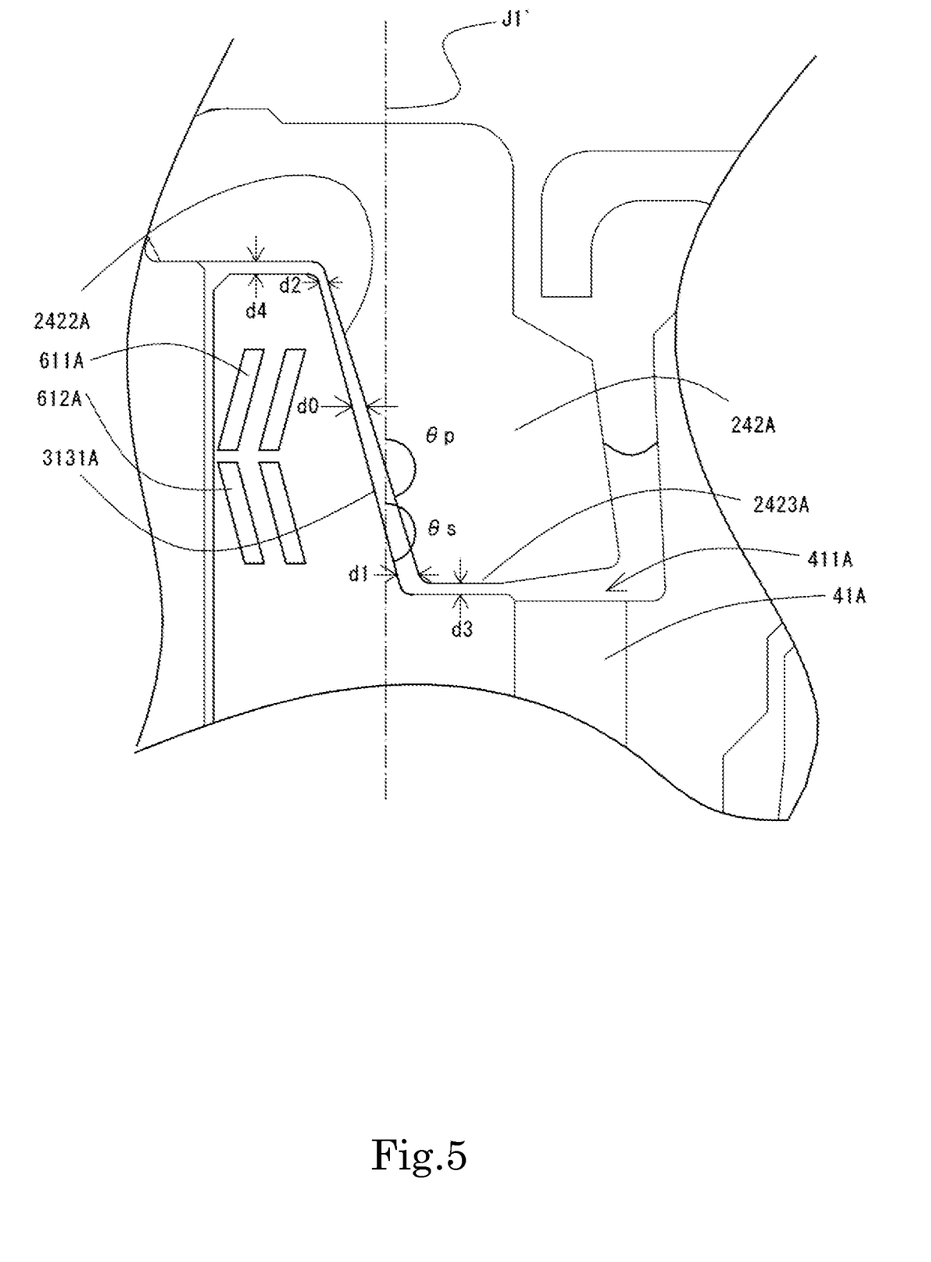
FIG. 5 is an enlarged partial cross-sectional view of a spindle motor according to another preferred embodiment of the present invention.

FIG. 5 is a partial cross-sectional view of a spindle motor according to another preferred embodiment of the present invention. In FIG. 5, a line that is parallel with the central axis J1 is shown as a one-dot chain line J1'. In this preferred embodiment, it is preferable that the inclination angle $\theta p$ of a plate inclined surface 2422A with respect to the central axis J1 is smaller than the inclination angle $\theta s$ of a sleeve inclined surface 3131A with respect to the central axis J1. In addition, it is preferable that a gap d0 between the plate inclined surface 2422A and the sleeve inclined surface 3131A extends toward the radial direction outer side.

In other words, the gap d0 between the plate inclined surface 2422A and the sleeve inclined surface 3131A becomes narrower in an upward direction.

In addition, a gap d3 that is farther on an inner side in the radial direction than an upper opening 411A of a through-hole 41A in a gap between an upper surface 3111A of an annular portion 311A and a lower surface 2423A of an annular convex portion 242A may be narrower than a lower end gap d1 in the gap between the plate inclined surface 2422A and the sleeve inclined surface 3131A.

In addition, the gap d3 may be narrower than a gap d4. In this case, it is preferable that a thrust dynamic pressure groove be arranged in an area of the gap d3.

As shown in FIGS. 2 and 3, an upper radial dynamic pressure groove array 61 and a lower radial dynamic pressure groove array 62 are preferably disposed on an inner circumferential surface of the sleeve 31. The upper radial dynamic pressure groove array 61 and the lower radial dynamic pressure groove array 62 are arranged apart from each other in the axial direction. When the spindle motor 1 is driven, dynamic pressure is induced to the lubricating oil 40 by the radial dynamic pressure groove arrays to constitute a radial dynamic pressure bearing. In addition, the inner side cylindrical portion 313 of the sleeve 31 and the upper radial dynamic pressure groove array 61 are preferably superimposed in the radial direction as shown in FIGS. 3 and 4.

The upper radial dynamic pressure groove array 61 and the lower radial dynamic pressure groove array 62 may be disposed on the outer circumferential surface of the shaft 21. In other words, the upper radial dynamic pressure groove array 61 and the lower radial dynamic pressure groove array 62 may be disposed on either the inner circumferential surface of the sleeve 31 or the outer circumferential surface of the shaft 21. However, the preferred embodiments of the present invention are not limited thereto. The upper radial dynamic pressure groove array 61 and the lower radial dynamic pressure groove array 62 may be disposed on both the inner circumferential surface of the sleeve 31 and the outer circumferential surface of the shaft 21.

It is preferable that the upper radial dynamic pressure groove array 61 and the lower radial dynamic pressure groove array 62 have a so-called herringbone shape. However, the preferred embodiments of the present invention are not limited thereto, and the upper radial dynamic pressure groove array 61 and the lower radial dynamic pressure groove array 62 may have an arc shape, for example.

In addition, the upper radial dynamic pressure groove array 61 and the lower radial dynamic pressure groove array 62 may be arranged adjacent to each other.

As shown in FIG. 4, the upper radial dynamic pressure groove array 61 preferably includes a plurality of upper spiral grooves 611 and a plurality of lower spiral grooves 612. The upper spiral grooves 611 are inclined in one direction with respect to the axial direction. The lower spiral grooves 612 are inclined in the other direction opposite to the one direction. It is preferable that the upper spiral groove 611 and the lower spiral groove 612 be arranged adjacent to each other in the axial direction. Further, a lower end 6111 of the upper spiral groove 611 is preferably positioned farther on an upper side than the upper surface 3111 of the annular portion 311. In addition, a lower end 6121 of the lower spiral groove 612 may preferably be positioned farther on an upper side than the upper surface 3111 of the annular portion 311.

The exemplary preferred embodiments of the present invention have been described above. However, the present invention is not limited to the preferred embodiments described above.

Figure 6:
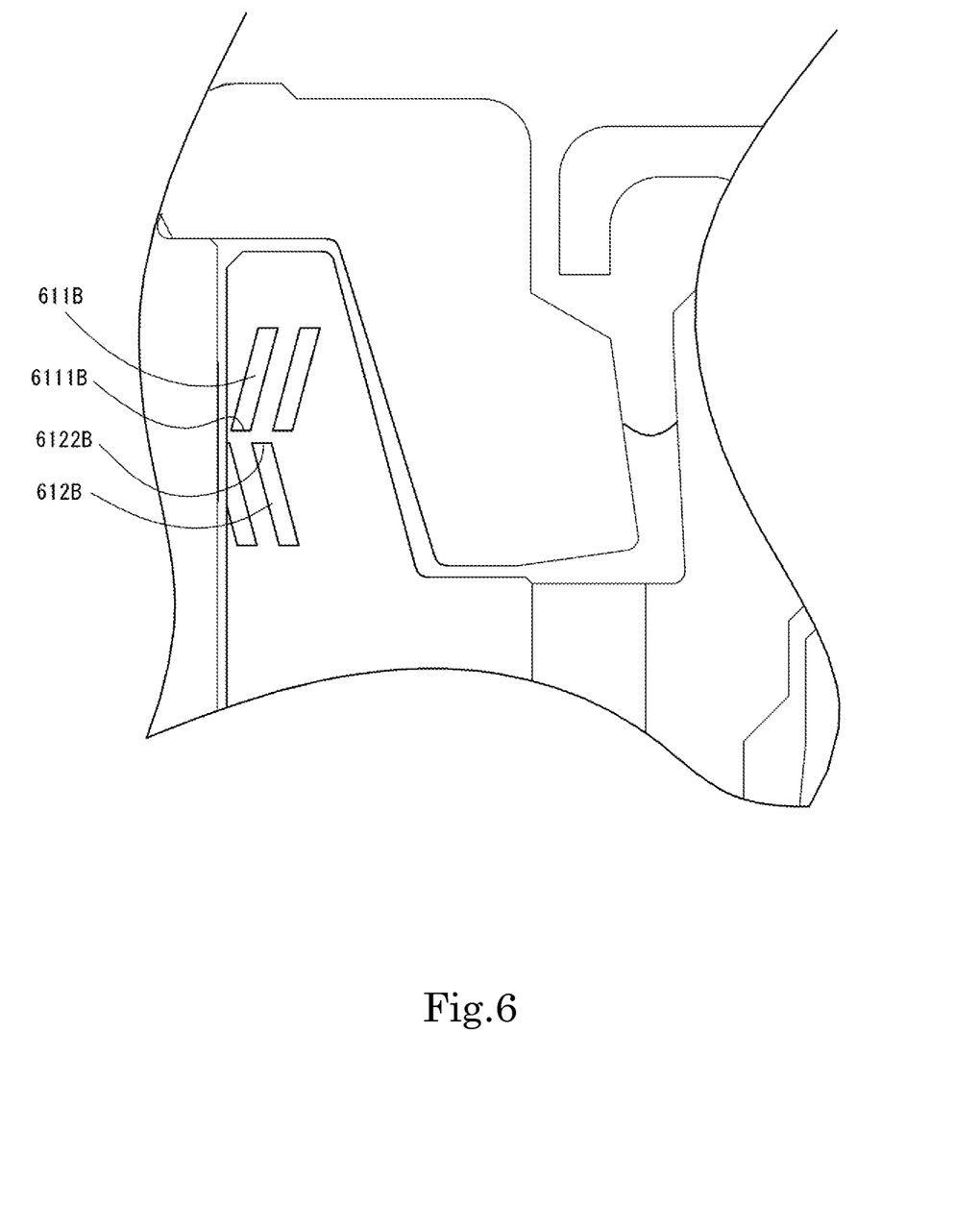
FIG. 6 is an enlarged partial cross-sectional view of a spindle motor according to a modified example of another preferred embodiment of the present invention.
Figure 7:
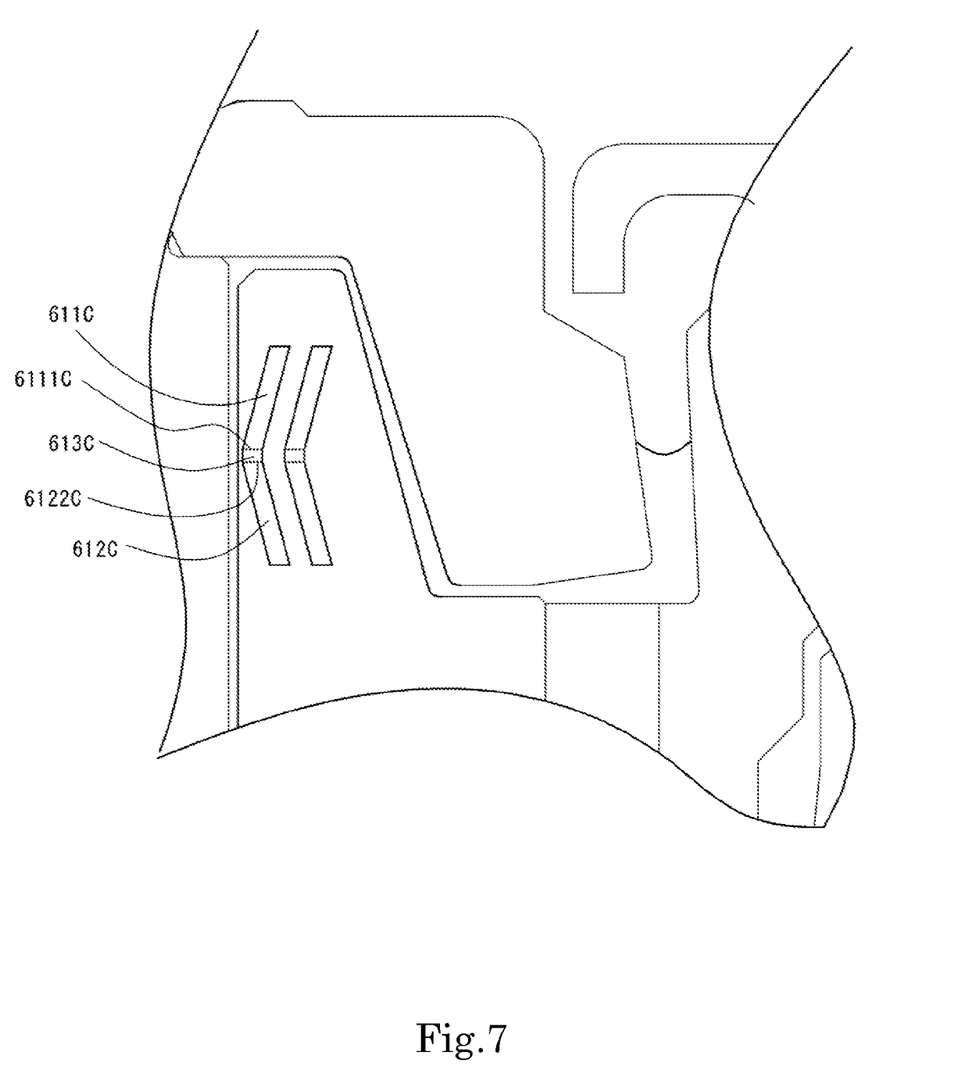
FIG. 7 is an enlarged partial cross-sectional view of a spindle motor according to a modified example of still another preferred embodiment of the present invention.
Figure 8:
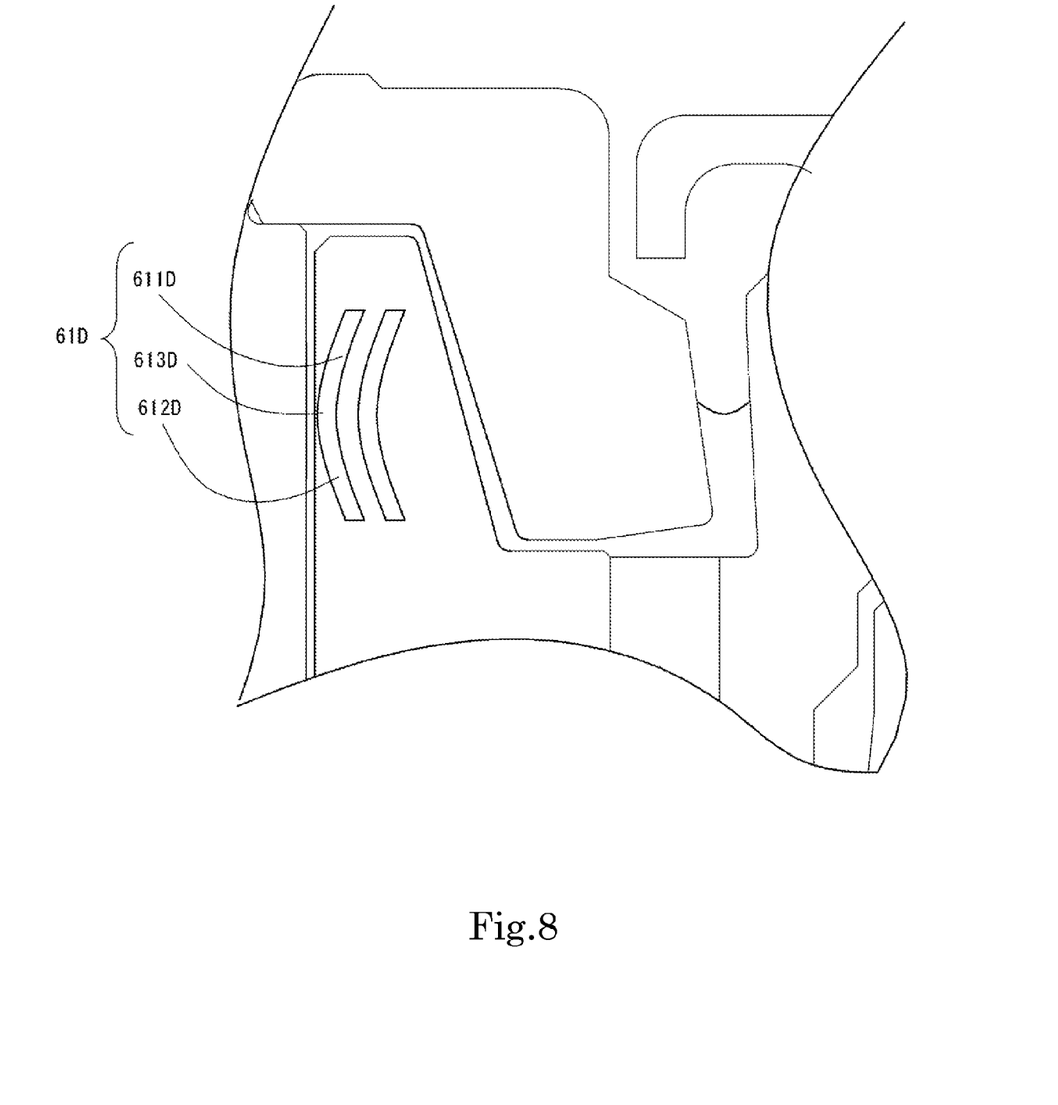
FIG. 8 is an enlarged partial cross-sectional view of a spindle motor according to a modified example of yet another preferred embodiment of the present invention.

For example, an upper spiral groove 611A and a lower spiral groove 612A may be arranged apart from each other in the axial direction as shown in FIG. 5. In this case, the upper spiral groove 611A and the lower spiral groove 612A may be arranged with a space therebetween. In addition, the number of the upper spiral grooves and the number of the lower spiral grooves may not be equal to each other. Furthermore, a circumferential direction position of a lower end 6111B of an upper spiral groove 611B and a circumferential direction position of an upper end 6122B of a lower spiral groove 612B may not be superimposed in the axial direction as shown in FIG. 6. In addition, an upper spiral groove 611C and a lower spiral groove 612C may be provided with a connecting connection groove 613C as shown in FIG. 7. In other words, a lower end 6111C of the upper spiral groove 611C and an upper end 6122C of the lower spiral groove 612C may be connected by the connection groove 613C. In addition, an upper spiral groove 611D, a lower spiral groove 612D, and a connection groove 613D may be provided in a smoothly continuous manner, as shown in FIG. 8. In other words, the upper spiral groove 611D and the lower spiral groove 612D may together define a curved upper radial groove 61D.

Both a rotating shaft type spindle motor with a rotating shaft and a fixed shaft type spindle motor with a non-rotating shaft preferably are used as a spindle motor in accordance with various preferred embodiments of the present invention. In addition, both an outer rotor type spindle motor and an inner rotor type spindle motor preferably are used as a spindle motor in accordance with various preferred embodiments of the present invention.

In addition, the spindle motor according to various preferred embodiments of the present invention and modifications thereof can be used in various types of electronic equipment such as, for example, a disk drive device and a fan.

Features of the above-described preferred embodiments and the modifications thereof may be combined appropriately as long as no conflict arises.

While preferred embodiments of the present invention and the modifications thereof have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
   a stationary portion including a shaft extending along a central axis extending upward and downward; and
   a rotating portion including a rotatable sleeve around the shaft; wherein
   the stationary portion further includes:
   the shaft;
   a circular plate portion that extends from the shaft to a radial direction outer side;
   a wall portion that extends upward from an outer edge of the circular plate portion and has a cylindrical or substantially cylindrical shape; and
   a plate portion that surrounds the shaft above the circular plate portion and has an annular or substantially annular shape;
   the plate portion includes:
   a flat plate portion that extends from an outer circumferential surface of the shaft to the radial direction outer side; and
   an annular convex portion that extends downward from an outer edge of the flat plate portion and has an annular or substantially annular shape;
   an upper radial dynamic pressure groove array and a lower radial dynamic pressure groove array are arranged apart from each other or adjacent to each other in an axial direction on one or both of an inner circumferential surface of the sleeve and the outer circumferential surface of the shaft;

the sleeve includes:
- an annular portion that has an annular or substantially annular shape;
- an outer side cylindrical portion that extends upward from an outer edge of an upper surface of the annular portion; and
- an inner side cylindrical portion that extends upward from an inner edge of the upper surface of the annular portion;

the annular convex portion includes a plate inclined surface configured such that a distance between the plate inclined surface and the central axis increases downwardly;

the inner side cylindrical portion includes a sleeve inclined surface configured such that a distance between the sleeve inclined surface and the central axis decreases upwardly;

the plate inclined surface and the sleeve inclined surface face each other via a gap;

the inner side cylindrical portion and the upper radial dynamic pressure groove array are superimposed in a radial direction;

the upper radial dynamic pressure groove array includes a plurality of upper spiral grooves that is inclined in one direction with respect to the axial direction and a plurality of lower spiral grooves that is inclined in another direction opposite to the one direction;

the plurality of upper spiral grooves and the plurality of lower spiral grooves are arranged apart from each other or adjacent to each other in the axial direction; and a lower end of the plurality of upper spiral grooves is positioned farther on an upper side than the upper surface of the annular portion.

2. The spindle motor according to claim 1, wherein
a lower end of the lower spiral groove array is positioned farther on an upper side than the upper surface of the annular portion.

3. The spindle motor according to claim 1, wherein
an inclination angle of the plate inclined surface with respect to the central axis is smaller than an inclination angle of the sleeve inclined surface with respect to the central axis.

4. The spindle motor according to claim 1, wherein
the sleeve includes a through-hole;
an upper opening of the through-hole is positioned in the upper surface of the annular portion;
a gap farther on an inner side in the radial direction than the upper opening in a gap between a lower surface of the annular convex portion and the upper surface of the annular portion is narrower than a lower end gap in the gap between the plate inclined surface and the sleeve inclined surface.

5. The spindle motor according to claim 4, wherein
the gap on the farther inner side in the radial direction than the upper opening in the gap between the lower surface of the annular convex portion and the upper surface of the annular portion is narrower than a gap between an upper surface of the inner side cylindrical portion and a lower surface of the flat plate portion.

6. The spindle motor according to claim 1, wherein
a gap between an upper surface of the inner side cylindrical portion and a lower surface of the flat plate portion is wider than an upper end gap in the gap between the plate inclined surface and the sleeve inclined surface.

7. The spindle motor according to claim 1, wherein
a circumferential portion of the lower end of the plurality of upper spiral grooves and a circumferential portion of an upper end of the plurality of lower spiral grooves are not superimposed in the axial direction.

8. The spindle motor according to claim 1, wherein
the upper radial dynamic pressure groove array further includes at least one connection groove that connects the plurality of upper spiral grooves and the plurality of lower spiral grooves with each other.

9. The spindle motor according to claim 8, wherein
the upper radial dynamic pressure groove array is a curved line in which the upper spiral groove array, the connection groove, and the lower spiral groove array are smoothly continuous.

10. A disk drive apparatus comprising:
the spindle motor according to claim 1;
a disk that is supported by the rotating portion of the spindle motor;
an access unit configured to perform at least one of reading and writing of information on the disk; and
a housing configured to accommodate the spindle motor, the disk, and the access unit.

\* \* \* \* \*